Feb. 8, 1966   A. GIRSBERGER   3,233,847
SYSTEM FOR GUIDING A MISSILE TOWARD A MOVING TARGET
Filed Nov. 5, 1962   3 Sheets-Sheet 1
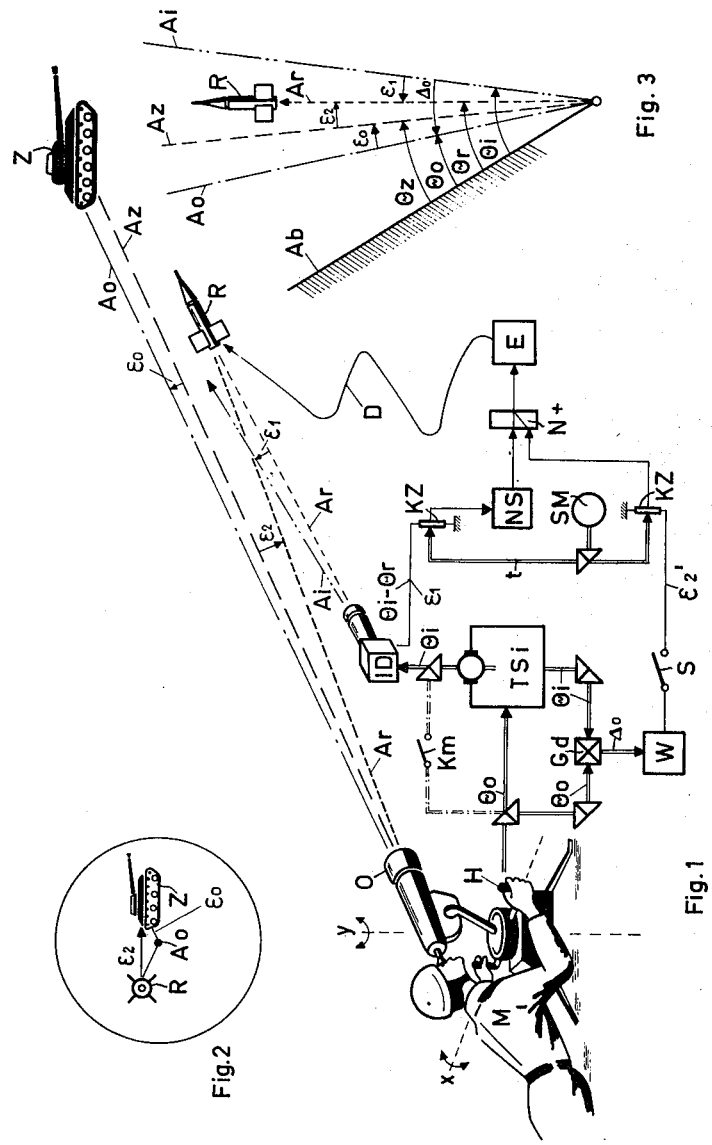
Inventor
Arthur Girsberger
by Michael S. Striker
Atty

United States Patent Office 3,233,847
Patented Feb. 8, 1966

3,233,847
SYSTEM FOR GUIDING A MISSILE TOWARD
A MOVING TARGET
Arthur Girsberger, Glattbrugg, Zurich, Switzerland
assignor to Contraves A.G., Zurich, Switzerland
Filed Nov. 5, 1962, Ser. No. 236,470
Claims priority, application Switzerland, Nov. 6, 1961,
12,828/61
12 Claims. (Cl. 244—14)

The present invention concerns a method and a system for guiding a remote-controlled object or missile toward a freely moving target along a trajectory leading to the target, by means of a control station containing means for taking a bearing on the object or missile and means for producing and transmitting guiding or demand signals thereto for guiding it into the desired trajectory. The guided or remote-controlled object may be e.g. an antiaircraft or anti-tank rocket or even a surface vehicle, provided that the guided object is equipped with steering devices responding to the above-mentioned guide signals and adjustable thereby from its neutral position for causing the guided object to change its course toward left or right and/or upwards or downwards. In guiding a remote-controlled object toward a freely moving target by means of a control station the desired location of the remote-controlled object is always defined by the actual line-of-sight from the control station to the target, and the guide signals transmitted to the remote-controlled object should be of such a nature that the actual trajectory or path of the remote-controlled object is changed by a servomechanism to the desired trajectory or path defined by the above-mentioned line-of-sight to the target.

Guidance methods and systems of the above-mentioned type are known in which at a control point there are installed an optical observation device, e.g. a telescope or a binocular handled by an observer, and a manually adjustable control device operated by this observer, the manually adjustable control device acting on a mechano-electrical transducer for producing guide or demand signals in accordance with the occurring adjustment of the control device from its neutral normal position. In this system the observer orients the observation device toward the target, determines continuously by visual observation the actually existing vectorial angular difference between the actual line-of-sight to the remote-controlled object and the optical axis of the observation device, and adjusts the control device manually in such a manner that the thereby produced guide signals which are transmitted to the remote-controlled object serve to change the actual trajectory or path of the remote-controlled object so as to coincide as much as possible with the line-of-sight to the target.

In this procedure the use of optical observation devices as binoculars, telescopes and the like is of particular advantage because the human eye has a substantially greater power of discrimination and resolution of objects or images of objects in close proximity to each other than known automatic devices for computing directions and angular differences. In this way, the operator or observer assumes in a guidance loop important functions of computing the error i.e. the difference between the actual and the desired values of the controlled variable and also additional functions of auxiliary devices frequently required in automatic guidance loops e.g. devices for smoothing signals and for forming mean values, error integrators, phase shifters and stabilizers.

On the other hand, the human being is subject to certain fundamental inadequacies which may prove disadvantageous in guidance loops. Thus, the human being's reaction time (time-lag) is a disadvantage and where there are oscillatory tendencies inherent in the system in the region of critical natural frequencies the unavoidable shaking of the human hand may result in control errors exceeding tolerable limits.

Since in a first approximation the observer adjusts the manual control device to a degree which is proportional to a visually established difference angle (error value), and since the guide or demand signals produced thereby are likewise approximately proportional to the adjustment of the manually adjustable control device, and since finally the resulting transverse accelerations of the remote-controlled object are approximately proportional to the amplitude or characteristic of the received guide signal, the entire procedure results in a so-called acceleration control.

This means that at any moment the transverse acceleration of the remote-controlled object or missile is approximately proportional to the observed error value i.e. to the adjustment of the manually adjustable control device. However, this type of acceleration control is not generally desirable because in this case the above-mentioned observer or operator would have to cause the transmission of at least two mutually opposed guide signal impulses each having a predetermined integral effect whenever the remote-controlled object is to be shifted from some actual position to a desired other position.

By means of certain modifications e.g. by providing a remote-controlled missile with a so-called autopilot system (flight regulator) whereby the course or flight path once adjusted or changed by guide signals is further on automatically maintained, it is possible to obtain a so-called velocity control or guidance in which case the transverse velocity is proportional to the adjustment of the manually adjustable control device. In this case, the shift of the actual position of the remote-controlled object to a desired position requires only one guide control impulse of predetermined integral effect. However, this simplification of the steering of flying objects entails above all the disadvantage that on account of the required autopilot system the rocket or missile must be made heavier and larger without thereby improving its main function consisting in carrying an explosive, incendiary or hollow charge to the target. In addition, this system is uneconomical particularly because a comparatively expensive auxiliary system must be built into the rocket or missile and is bound to be destroyed together with the charge when reaching the target, i.e. after having completed its task only once. On the other hand, if any required auxiliary devices are located at the command or control station, they remain utilizable for many consecutive rocket or missile releases.

On the other hand, automatic direction finder devices with adjustable orientation axis are known which are designed to produce guide or demand signals which correspond at any time to the vectorial angular difference between the actual line-of-sight toward the remote-controlled object and the orientation axis of the direction finder device. Devices of this type may be for example radar devices. More recently also infrared direction finders have been developed which project the image of an infrared source existing on the remote-controlled object onto a picture plane oriented perpendicularly relative to the orientation axis of the direction finder. The vectorial location error of this image relative to the center point of the picture plane corresponding to the orientation axis is then automatically indicated by means of two electric signals representing the components of the error vector. If now these electrical error signals are transmitted to the remote-controlled object a closed guidance servo-loop is established which causes the remote-controlled object to move continuously approximately along the orientation axis of the automatic direction finder. Since the transfer functions of the various elements of such a servo-loop essential for servo-guidance can be established in advance by experiments and theoretical considerations in explicit form, such an automatic guidance servo-loop can be set up comparatively easily for optimum performance, for instance by providing therein a stabilizing network with correspondingly predetermined transfer functions and/or by providing therein so-called error integrators which are capable of causing the remote-controlled object always to follow the orientation axis of the direction finder with only small error even if there are continuously acting interfering influences e.g. wind in transverse direction. At least in the case of quasi-static conditions, i.e. in the case of comparatively small angular velocities of the orientation axis of the automatic direction finder it can be accomplished in this manner that the remote-controlled object is guided rapidly and steadily into its desired path in the best possible manner after each interference tending to cause a deviation from the desired path. However, even in this case, lasting errors may develop within a range below the resolution capability of the direction finder, and so-called dynamic track alignment errors may develop which remain uncorrected due to translatory movements affecting continuously the remote-controlled object and/or the orientation axis of the direction finder.

However, whenever up to now an automatic direction finder of the above mentioned type has been used for guiding an object towards a freely moving target additional or auxiliary devices were needed for transmitting the orientation of the orientation axis of the automatic direction finder to the remote-controlled object. Also it has to be borne in mind that for instance radar type tracking devices are useless and impractical if the target moves along the ground or only at a low level above it. Finally, the disadvantage exists that errors occurring in the transfer of movements of the line-of-sight toward the target to the orientation axis of the direction finder tracking the remote-controlled object cannot be determined objectively because the interconnection constitutes a so-called open control system.

Still another possibility of using an automatic direction finder for tracking a remote-controlled object consists in having the orientation axis of the direction finder oriented manually by an operator on the basis of visual observation directly towards the target. However, it is practically impossible to hold precisely a freely moving and rapidly maneuvering object in alignment with the cross-lines of the observation instrument. In addition, the accuracy on the entire guidance system may be severely affected by remaining location errors of the remote-controlled object relative to the orientation axis of the direction finder and by errors in the adjustment thereof with relation to the orientation axis of the observation instrument. Finally, unavoidable shaking movements of the hand of the operator would be transmitted to the orientation axis of the direction finder and thereby also to the remote-controlled object so that the latter would be caused to carry out undesirable oscillations about its transverse axes.

It is one object of the present invention to improve a control method and system for missiles or the like of the type described in such a way that the additional expenditure incurred is aligned to the components of the system, which are located at the control station and can be used many times, rather than to the missile itself.

A further object of the invention is to provide the arrangements requisite for a position-control of the missile or the like in which the magnitude of the transverse displacement of the guided missile or the like from its actual path towards a desired path is at least approximately proportional to the adjustments of the manually adjustable control device, thus substantially simplifying the operator's task.

Another object of the invention is to provide arrangements so that any trembling movements of the operator as he manipulates the controls, insofar as these lie in the frequency range of the natural oscillations of a missile around its pitch axis (pitch motions), are prevented from including such pitching movements without, however, impeding the immediate transmission of instantaneous corrective commands to the control elements of the missile. For instance, the adjusting element operated by the manipulations of the hand-controls and actuating the unit which converts the mechanical angular movements into suitable electric signals could, instead of being connected rigidly with the hand-controls by mechanical means, be coupled to them by a drag spring with a highly damping action, or a low pass filter could be incorporated in the electrical transmission channel for the electric signals so that the upper bands of the frequency spectrum would be attenuated. But this would also forfeit the possibility of converting large and rapid movements of the hand-controls into correspondingly rapid changes of the course of the missile such as are necessary if the target changes its motion abruptly when the approaching missile is already in its close proximity.

It will be shown that the present invention shows new ways of overcoming the disadvantages explained above and characteristic of known guidance systems, by providing a system in which the advantages of the first mentioned known guidance systems based on manual control are combined with the advantages of the second mentioned guidance systems operating with a closed guidance loop and with an automatically operating direction finder.

With above objects in view the invention includes an arrangement for guiding from a control point a remote-controllable moving object toward a moving target, comprising, in combination, optical means located at the control point adapted to track optically the moving target and the moving object and including means for indicating an existing first vectorial angular difference between the line-of-sight to the moving object and the line-of-sight to the moving target and control means for adjusting the optical axis of said optical means through an error angle equal to said first angular difference so as to cause said optical axis to coincide with said line-of-sight, automatic beam-rider guidance means located substantially at said control point and having an adjustable orientation axis and including means for operating with a guide beam substantially along a line between said control point and said remote-controllable moving object and transmitter means for transmitting demand signals to said remote-controllable moving object for causing the latter to assume a desired course substantially coinciding with said orientation axis and said guide beam, said demand signals normally corresponding to an existing second vectorial angular difference between said orientation axis and said optical axis of said optical means directed at said remote-controllable moving object at a given moment, and movement transmission means cooperating with said control means of said optical means and with said automatic beam rider guidance means for keeping said orientation axis thereof substantially in alignment with said line-of-sight to the target as determined by said optical axis of said optical means when adjusted so as to eliminate said first angular difference.

In a system of this kind the observer or operator of the optical observation instrument is able to ascertain visually with great accuracy whether the remote-controllable object or missile which is to be guided toward the target indeed moves accurately along the line-of-sight from the control point to the target. In case he notices a deviation all he has to do is to adjust the manual control device in such a manner that the discovered deviation is reduced or eliminated whereafter the observation device may remain in its new position until a further adjustment is necessary. By the low-pass filter means in the movement transmission device those components of the movement frequency spectrum which have a comparatively high frequency are damped very much more than the low frequency components of this spectrum. Consequently, the orientation axis of the automatic beam-rider guidance system is adjusted very steadily and the remote-controllable object or missile follows such adjustments also steadily. In this manner a position control of the remote-controllable object is effected inasmuch as the remote-controllable object changes its position relative to the line-of-sight to the target depending upon the adjustment of the manually operable control means.

A system of this kind may be further improved inasmuch as the manually operable control means are supplemented by means for converting its adjustment movements in to additional guide or demand signals which are added to the similar demand signals produced by the automatic beam-rider guidance system before the latter are transmitted to the remote-controllable object. In this manner one obtains the desirable effect that, when in the case of rapid adjustment movements of the manual control e.g. because the target abruptly changes its condition of movement in order to dodge the remote-controlled object, the latter first rapidly follows such adjustment movements of the manual control, but thereafter steadily slides back into a path coinciding with the adjusted orientation axis of the automatic beam-rider guidance system. It is therefore of particular advantage if additional means are provided for establishing an existing angular difference between the position of the manually operated control device of the optical observation device and the orientation axis of the automatic beam-rider guidance system, and moreover means for producing an additional demand signal portion corresponding proportionally to such angular difference.

Consequently, at the outset the manual operation of the control device causes transmission of this partial demand signal portion in its full magnitude to the remote-controllable object; however, as the latter swings in line with the orientation axis of the automatic guidance system the amount of this partial signal decreases rapidly. In order to avoid during the launching phase of the remote-controllable object a disturbance of its course by the manually initiated partial guide or demand signals, a switch may be provided in the circuit of the above-mentioned partial demand signals to an adding device where these partial demand signals are combined with other partial demand signals caused by the alignment of the optical axis of the observation instrument with the line-of-sight to the target. By closing this switch only after the remotely-controllable object has aligned itself with the orientation axis of the guidance system the combined demand signal portions will be transmitted to the remotely-controllable body only a certain time period after the launching.

If the guidance loop comprising the automatic beam-rider guidance and the remotely-controllable object includes a stabilizing network which necessarily acts as a differentiating network and cuts out signal components of elevated frequencies, then it is advantageous to arrange this stabilizing network between the adding means for additively combining the two partial demand signals and the actual automatic guidance apparatus because in this case the demand signals passing through the stabilizing network do not contain high frequency components as is desirable and because the other partial demand signals derived from the operation of the manual control device having such higher frequency components are not passed through that stabilizing network.

It should be understood that in reference to the present invention the term "vectorial angular difference between the line-of-sight to the remote-controllable object and the line-of-sight to the target" is always intended to mean a vector composed of two components, namely, e.g., azimuth and elevation so that it is always implied that the corresponding error and demand signals represent vectorial values composed of two components. The same applies analogously to all other angles and angular differences.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIG. 1 shows, partly in schematic form, a signal circuit diagram of a basic embodiment;

FIG. 2 shows the field of vision through the viewer of FIG. 1;

FIG. 3 is a geometrical system of axes shown diagrammatically in a common horizontal plane;

Figure 4:
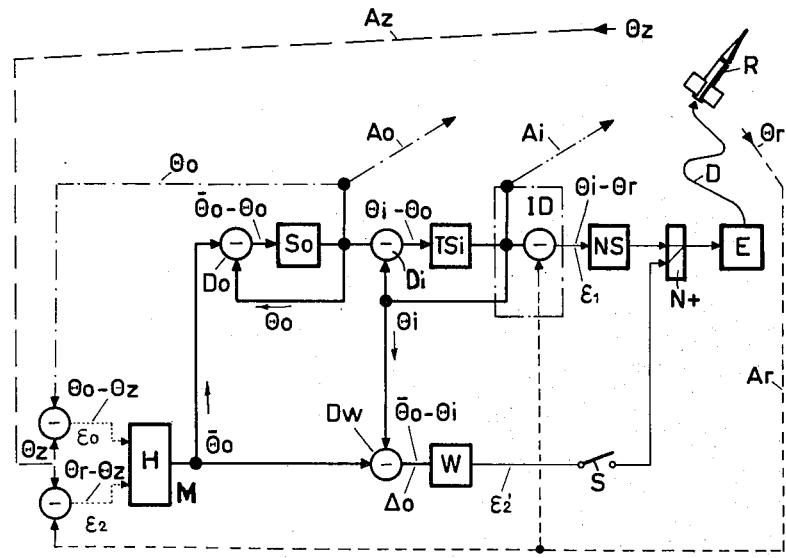
FIGS. 4 and 5 are simplified diagrams showing alternative versions of the system as per FIG. 1.

In the system as per FIG. 1 an operator M is observing a freely moving target Z, for example a tank, with the aid of a viewer O, for example a binocular telescope. This telescope is connected rigidly by means of mechanical transmission agents to a hand-controller H. This hand-controller can be turned about a vertical axis Y and a horizontal axis X so that (see FIGS. 3 and 6) approximately the value $\theta_z$ (angle between the reference axis A$b$ and the line of sight A$z$ to the target Z) can be superposed on the angle $\theta o$ formed by the optical axis of observation A$o$ and the fixed reference axis A$b$, i.e. the operator adjusts his hand-controls so that the difference $\epsilon o = \theta z - \theta o$ is reduced toward zero. The angular values $\epsilon o$ imparted to the hand-controls by the hand of the operator M are fed as initial data through a low-pass filter containing servo system TS$i$ in order to adjust the directional axis A$i$ of an infra-red locating apparatus ID, referred to hereinafter as an infra-red apparatus. In this way the directional axis A$i$ of the infra-red apparatus is set at an angle $\theta i$ in relation to the reference axis A$b$, this angle being approximately the same as the angle $\theta o$ of the viewer. This is substantially indicated by FIG. 1, but cannot be seen in FIG. 3 due to its diagrammatic nature. But the frequency spectrum effectively transmitted by the low-pass servo system is restricted to a range of 0 to $fo$ c.p.s. so that the response of the directional axis A$i$ of the infra-red apparatus to abrupt changes in the position of the hand-controls H is retarded and damped. The limit frequency $fo$ may, for example, be 0.5 c.p.s. The infra-red apparatus images any infra-red sources in its field of vision on a screen to which are assigned electrical means of generating electrical error signals which correspond to the distance of the image from the center of the field of vision, i.e. to the angle difference $\epsilon 1$ as described below.

In the present case the jet nozzle of an antitank missile R serves as an infra-red source and the infra-red apparatus thus generates electrical error signals $\epsilon 1$ which correspond to the instantaneous difference between the angle $\theta i$ formed by the directional axis A$i$ of the infra-red apparatus ID and the reference axis A$b$ and the instantaneous angle $\theta r$ formed by the line-of-sight to the rocket and the reference axis A$b$, or are proportional to their $x$ and $y$ components. These error signals $\epsilon 1$ are fed to the control elements of the rocket by way of the stabilizing network NS, a transmitter E and the wire D trailing from the rocket R, with the result that the control elements of the rocket are actuated in such a way that the rocket alters its course so as to slip into the infra-red directional axis A$i$. Such a system corresponds to the so-called beam-rider guidance of a remote-controlled missile. Since it was a precondition that the directional axis $Ai$ of the infra-red apparatus ID coincided at least approximately with the optical axis of observation $Ao$, the rocket flies also approximately along the optical axis of observation $Ao$ towards the target Z. Thus, as shown in FIG. 2, the operator continually sees in the field of vision of his viewer both the target Z and the rocket R. He will at first move the hand-controls only sufficiently for the optical axis $Ao$, i.e. the center of his field of vision, to be approximately aligned with the target Z. If the stabilizing network and all the other components of the beam-rider guidance system are correctly regulated, the rocket should move smoothly and comparatively quickly into a course leading approximately to the target. With the aid of a differential unit $Gd$ the angular difference $\Delta o$ between the instantaneous setting $\theta o$ of the optical axis of observation $Ao$ and the instantaneous setting $\theta i$ of the infra-red directional axis is extracted and converted in a transducer W into proportional electrical error signals $\epsilon 2'$. With switch S being closed, the electrical error signals $\epsilon 2'$ are injected into the beam guidance circuit NS, E by way of an adding network N+ between the stabilizing network NS and the transmitter E.

If, with switch S being closed, the operator now moves hand-controls H through the visually ascertained angular error $\epsilon 2$ between the line-of-sight $Az$ to the target Z and the line-of-sight $Ar$ to the rocket, the course of the rocket will again be influenced by transmission of an error signal $\epsilon 2'$ in such a way that this angular error $\epsilon 2$ is reduced to zero, i.e. the line-of-sight to the rocket coincides with the line-of-sight to the target exactly. After the rocket R is blasted off from the control point, it is important that the switch S should be left open a certain time so that in this initial phase the rocket is influenced solely by the signals $\epsilon 1$ of the infra-red beam-rider guidance circuit, this automatic guidance loop being so designed that the rocket quickly and smoothly slips into the desired course given by the infra-red guide axis $Ai$. As it is a precondition of the system that the infra-red guide axis is adjusted by a low-pass servo system which does not effectively transmit higher frequency movements of the hand-controls and hence experiences no abrupt or rapidly oscillating movements, no rapidly changing signals of a corresponding kind are transmitted to the rocket and the incitement of pitching movements leading to instability is obviated.

It is also very important that the components of the angle $\theta o$ of the optical axis $Ao$, i.e. the adjusting movements of the hand-controller, should not be translated alone into electric error signals $\epsilon 2'$ but that solely the difference $\Delta o$ already explained should be converted into electrical signals because in this way it is possible to achieve position-control of the rocket. If in the system as per FIG. 1 the operator M executes an abrupt movement of the hand-controls H corresponding to the visually ascertained angular error, a demand signal of corresponding magnitude will be immediately transmitted to the rocket if switch S is closed. But since the corresponding new angle $\theta o$ is also fed to the servo system $TSi$ for the infra-red apparatus, the infra-red directional axis $Ai$ follows this new angle with a retarded and damped motion. When the set angle $\theta i$ of the infra-red directional axis has after a certain time taken up the newly set angle $\theta o$, the error signals $\epsilon 2'$ generated in the transducer W are reduced to zero and the rocket has time to move through the agency of the optimalized beam-rider guidance circuit into the new course determined by the adjusted infra-red directional axis. On this being accomplished, and if the rocket has not meanwhile been brought out of the line-of-sight by new disturbances or as the result of the new movements of the target, the aforementioned adjustment of the hand-controls H will have no further influence on the course of the rocket, i.e. a virtually ideal position-control is achieved of the kind most easily learned by human beings.

It is also of great importance that the rapidly changeable demand signals $\epsilon 2'$ from the transducer W are injected into the automatic beam-rider guidance circuit for the rocket and by-pass the stabilizing network NS. Such a stabilizing network is intended to cause a phase advance in the signals transmitted to it and it therefore also has the effect of raising the amplitude of the higher frequency components of the signal. It happens, however, that in the manual operation of the controls by human beings shaking and return movements are unavoidable and also generate components of higher frequency which may coincide with the natural pitch oscillation of the rocket about its transverse axes, these being in the region of 1–2 c./s. If the demand signal $\epsilon 2'$ generated in the transducer W by these movement components of higher frequency are passed through the stabilizing network NS of the beam-rider guidance circuit, they would be amplified and might induce pitching of the rocket, thus impairing the accuracy of its course. In the guidance system described the higher frequency components of the movements imparted to the hand-controller are not passed onto the stabilizing network NS because they are filtered out in the low-pass servo system thereof and the signals $\epsilon 2'$ containing such higher frequency components are not fed to the stabilizing network NS, thus eliminating any increase in the level of such higher frequency components capable of inducing pitching of the rocket.

To facilitate more rapid alignment of the two axes ($Ao$, $Ai$) with the target before the rocket is blasted off, it may be of advantage to couple the infra-red directional axis $Ai$ rigidly with the optical axis of observation $Ao$, this being indicated in FIG. 1 by the mechanical coupling device $Km$.

Instead of an active servo motor system $TSi$ for swivelling the infra-red directional axis, a coupling device can be provided which has a damping effect on movement components of higher frequency and in which the driving and driven shaft are coupled through an essentially elastic means of entrainment and the movements of the driven shaft are damped by highly viscous fluids or eddy-current brakes.

Since in beam-rider guidance systems for missiles a lateral deviation of the rocket in units of distance from the desired position (axis) has to be corrected and not an angle, it is of advantage, at least in the transmission channel for error signals $\epsilon 1$ of the infra-red apparatus ID and, where necessary, also in the transmission channel for signals $\epsilon 2'$, to provide a cone-cylinder transformation apparatus KZ in which the electrical signals proportional to the angles $\epsilon 1$ and $\epsilon 2$ ar multiplied by a factor proportional to the instantaneous distance of the rocket from the control point at any given moment. This can be achieved, for example, by arranging for voltage divider resistors in such transformation apparatus to be adjusted time-proportionally by a synchronous motor.

FIG. 4 is a simplified signal circuit diagram of an alternative version of the system as per FIG. 1.

By visual observation the operator M measures the difference $\theta o - \theta z$ between the angle of direction $\theta z$ of the line-of-sight $Az$ to the moving target Z and the angle of direction $\theta o$ of the optical axis of observation $Ao$ and sets at the hand-controller H (output) an angle of direction $\overline{\theta o}$ which is transmitted to a difference extractor $Do$ at the input of rapid-action servo system $So$ in order to adjust the optical axis $Ao$ of the view O, i.e. the angle $\theta o$. The angle of direction $\theta o$ of the observation axis $Ao$ is also transmitted to the difference extractor $Do$, so that the servo system $So$ is controlled with the difference $\overline{\theta o} - \theta o$ as the initial data. The servo system $So$ is a relatively rapid system whose purpose is to enable the optical axis $Ao$ of the viewer O to track the target with the minimum time-lag. Thus the system $So$ functions like a direct mechanical coupling as per FIG. 1, with the difference, however, that the work of moving the viewer need not be done by the human hand. In other respects the system as per FIG. 4 corresponds to that as per FIG. 1. That is to say, the set angle $\theta o$ of the optical axis of observation is fed to a difference extractor $Di$ at the input of a low-pass servo system $TSi$ in order to procure the retarded and damped adjustment of the angle of direction $\theta i$ of an infra-red apparatus ID and this angle of direction is returned to the difference extractor $Di$ at the input of the low-pass servo system so that the latter is controlled with the value $\theta i - \theta o$ as the initial data. Only the difference extractor of the infra-red apparatus ID is shown, which converts into an electric signal the difference $\epsilon 1 = \theta i - \theta r$ ($\theta r$=angle of direction of the rocket axis $Ar$; $\theta i$=angle of direction of the infra-red directional axis $Ai$). This error signal $\epsilon 1$ is fed, as per FIG. 1, through a stabilizing network NS, a transmitter E and the trailing wire D to the control elements of the rocket R, whose course is then automatically corrected to bring it into line with the infra-red guide axis $Ai$. As in FIG. 1 the set angles $\theta o$ of the hand-operated controller and $\theta i$ of the infra-red guide axis $Ai$ are subtracted from each other in a difference extractor Dw to form the difference $\Delta o = \overline{\theta o - \theta i}$ and this angular difference is converted in a transducer W into a corresponding electrical demand signal $\epsilon 2'$ which is fed when the switch S is closed to a summing device N+ between the stabilizing network NS and the transmitter E.

Figure 5:
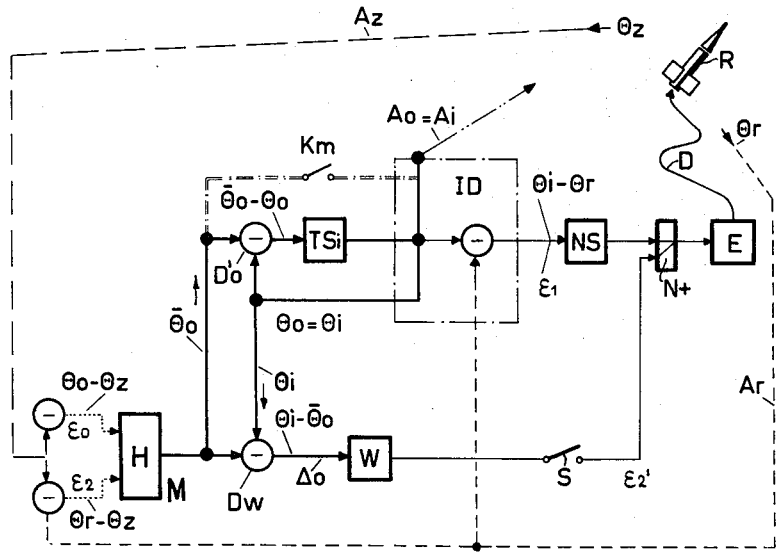

The system as per FIG. 5 differs from that as per FIG. 4 in that the axes $Ao$ of the viewer and $Ai$ of the infra-red guide beam are positively coupled together and are both adjusted by means of a low-pass servo system $TSi$ which can be rigidy by-passed by the mechanical coupling device $Km$. Thus only one servo system is used instead of two, but the directional axis of the viewer follows the control movements of the hand-controls H only after a time-lag.

Figure 6:
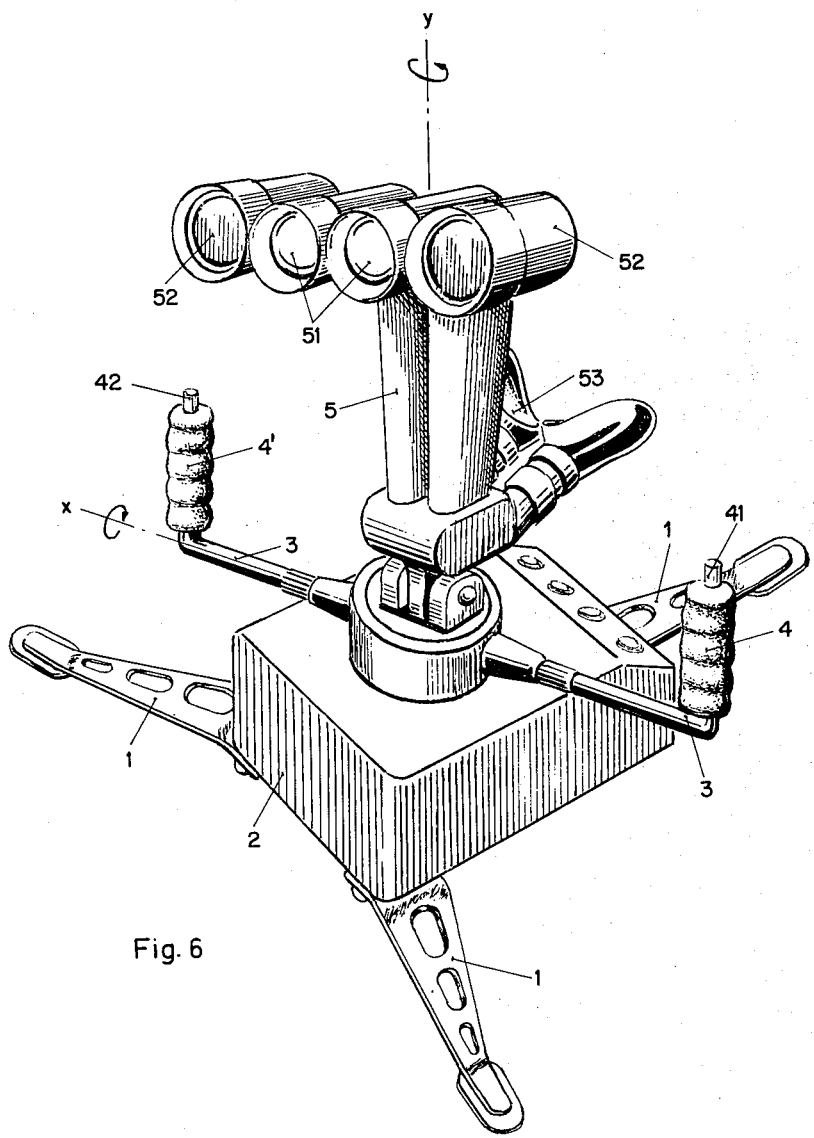
FIG. 6 is a diagram showing a hand-controller combined with an infra-red locator.

A controller of this kind is shown diagrammatically in FIG. 6. On three legs 1 a housing 2 is supported in which a two-arm lever 3 with two handgrips 4, 4' is pivoted so that it can be rotated about both the vertical axis Y and its horizontal longitudinal axis X. Movement about its vertical axis Y causes changes in the azimuth components $\overline{\theta o y}$ and movement about the horizontal axis causes corresponding changes in the elevation components $\overline{\theta o x}$ of the angle of direction $\overline{\theta o}$ in the system as per FIG. 5. Each of these movement components is transmitted through drag springs to a rigid carrier structure 5, which is oil-damped or braked by an eddy-current arrangement and supports a viewer 51, the optical system 52 of an infra-red angular error detector and a chin-support 53 for the observer, in such a way that retarded and damped changes of the azimuth components $\theta i y$ and the elevation components $\theta i x$ are imposed upon these parts which are themselves rigidly connected together by the carrier structure. The directional axes of the viewer and the infra-red apparatus are thus adjusted through the agency of a passive low-pass servo system by means of handgrips 4, 4'.

By means of press button 41 on handgrip 4 a rigid coupling between lever 3 and carrier structure 5 for the optical systems can be actuated or left released before the rocket is blasted off. By means of a press button 42 on the other handgrip 4' the switch S in the systems as per FIGS. 1, 4 and 5 can be closed in order to permit the direction transmission of manually generated demand signals $\epsilon 2'$ to the summing device N+. Since the parts of the system whose operation has been described, more especially the difference extractor for angles and electrical quantities, active or passive servo systems, infra-red angular error detectors, stabilizing elements, summing elements, transmitters, remote-controlled rockets or other vehicles, cone-cylinder transformation apparatus, and transducers for converting mechanical quantities into electrical signals are in themselves known in many embodiments, no detailed description of their construction is given here.

Nor is the theory of such a system explained in an explicit mathematical form. It should be mentioned that such a guidance system could also be used with anti-aircraft rockets or remote-controlled vehicles on the ground and that instead of an infra-red apparatus of the kind described other analogous devices could be used to implement a beam-rider guidance system.

Provision might also be made in the systems as per FIGS. 1, 4 and 5 for the functions performed there by one operator, i.e. bringing the optical axis of observation $Ao$ to bear on the target and matching to it the line-of-sight to the rocket, to be shared between two operators. One of them would use his hand-controls to keep his own axis of observation bearing on the target and, retarded by the low-pass servo system, the infra-red apparatus directional axis too. The viewer of this first operator would then have to be rigidly coupled with the viewer of the second operator so that this second operator would also constantly see the target in his field of vision. When the rocket has been brought by the infra-red guidance system into a smooth course aiming approximately at the target, the second operator could then close the switch S and operate hand-controls of his own in accordance with the distance the rocket deviates from the target. These corrective movements would also have to be transmitted through the low-pass servo system to the infra-red apparatus and the difference $\Delta o$ between the angle $\theta o$ of the optical axis of observation and the directional axis $Ai$ of the infra-red apparatus would be converted in the systems explained into electric signals and these would be fed to the transmitter E behind the stabilizing network NS.

It will be understood that each of the elements described above, or two or more together, may also find a useful application in other types of a method and arrangement for guiding a remote-controlled missile toward a moving target differing from the types described above.

While the invention has been illustrated and described as embodied in a method and arrangement for guiding a remote-controlled missile toward a moving target by means of a combination of a visual tracking and a beam-rider guidance system, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as now and desired to be secured by Letters Patent is:

1. A system for guiding a remote-controllable moving object toward a freely moving target along a target path from a control station including control means for locating said moving target and said moving object and for generating and transmitting guidance control signals to said moving object for guiding said moving object into said target path, said system comprising, in combination, automatically operating locating means at said control station having an adjustable orientation axis for generating guidance control signals which continually correspond to the vectorial angular difference between a momentary line-of-sight to said moving object and the orientation axis of said automatically operating locating means, said guidance control signals being transmitted to said moving object via said control means for adjusting the path of movement of said moving object to cause coincidence of said path of movement with the orientation axis of said automatically operating locating means; optical means at said control station for subjectively visually determining the position error of said moving object relative to the line-of-sight from said control station to said moving target; manually adjustable guidance means coupled to said optical means; and movement transmission means coupling said guidance means with said automatically operating locating means for varying said orientation axis, said movement transmission means including low pass filter means through which movement is transmitted from said guidance means to said automatically operating locating means for preventing the transmission of adjustment movements of said guidance means occurring at frequencies exceeding a predetermined upper limit.

2. A system as claimed in claim 1, including converting means for converting adjusting movements of said guidance means into additional guidance control signals, addition means for adding the additional guidance control signals to the guidance control signals from the automatically operating locating means to provide resultant sum signals, and transfer means for transferring said resultant sum signals to said moving object.

3. A system as claimed in claim 2, wherein said movement transmission means includes means for producing the momentary angular difference between said guidance means and the orientation axis of said automatically operating locating means, said converting means producing said additional guidance control signals in proportional dependence upon said angular difference.

4. A system as claimed in claim 3, including selectively operable switch means connected between said converting means and said addition means for selectively transmitting to said addition means said additional guidance control signals.

5. A system as claimed in claim 4, including signal stabilization network means connected between said automatically operating locating means and said addition means for adding said additional guidance control signals and said guidance control signals.

6. A system as claimed in claim 5, including transformation means connected between said automatically operating locating means and said stabilization network means for cone-cylinder transformation in dependence upon one of time and distance of the guidance control signals generated by said automatically operating locating means.

7. A system as claimed in claim 1, including active servomechanism means having low pass filter means coupled to said guidance means for adjusting the optical axis of said optical means.

8. A system as claimed in claim 1, including active servomechanism means having low pass filter means coupled to said automatically operating locating means for adjusting the orientation axis of said automatically operating locating means.

9. A system as claimed in claim 8, including selectively operable coupling means for rigidly mechanically coupling said guidance means with said automatically operating locating means for varying said orientation axis.

10. A system as claimed in claim 1, wherein said automatically operating locating means comprises infra-red locating means responding to infra-red radiation of said moving object.

11. A system as claimed in claim 1, wherein said automatically operating locating means includes infrared optical means, said system including positioning means having a pair of coaxial end-to-end extending manually operable guidance arms turnable about their common longitudinal axis and about an axis extending transversely to said axis and coupled to said optical means and said infrared means through said movement transmission means.

12. A system as claimed in claim 2, wherein said automatically operating locating means includes infrared optical means, said system including positioning means having a pair of coaxial end-to-end extending manually operable guidance arms turnable about their common longitudinal axis and about an axis extending transversely to said axis and coupled to said optical means, selectively operable switching means mounted on one arm of said positioning means for providing rigid mechanical coupling between said optical and infrared means and said movement transmission means, and other selectively operable switching means mounted on the other arm of said positioning means for permitting the transfer of said additional guidance control signals to said addition means.

References Cited by the Examiner
UNITED STATES PATENTS
2,944,763    7/1960    Grandgent et al. _____ 244—14

BENJAMIN A. BORCHELT, *Primary Examiner.*
SAMUEL FEINBERG, *Examiner.*